(12) United States Patent
Hafemeister

(10) Patent No.: US 8,614,769 B2
(45) Date of Patent: Dec. 24, 2013

(54) INTERMEDIATE FREQUENCY PROCESSING DEVICE FOR PROCESSING BOTH ANALOGUE AND DIGITAL TELEVISION INTERMEDIATE FREQUENCY SIGNALS

(75) Inventor: Thomas Hafemeister, Hamburg (DE)

(73) Assignee: NXP, B.V., Eindhoven (NL)

( * ) Notice: Subject to any disclaimer, the term of this patent is extended or adjusted under 35 U.S.C. 154(b) by 1630 days.

(21) Appl. No.: 11/815,102

(22) PCT Filed: Jan. 26, 2006

(86) PCT No.: PCT/IB2006/050287
§ 371 (c)(1),
(2), (4) Date: Jul. 30, 2007

(87) PCT Pub. No.: WO2006/079990
PCT Pub. Date: Aug. 3, 2006

(65) Prior Publication Data
US 2010/0045874 A1    Feb. 25, 2010

(30) Foreign Application Priority Data

Jan. 28, 2005  (EP) .................................... 05100570

(51) Int. Cl.
| H04N 5/46 | (2006.01) |
| H04N 5/50 | (2006.01) |
| H04N 5/60 | (2006.01) |
| H03D 5/00 | (2006.01) |
| H04B 1/06 | (2006.01) |
| H04B 7/00 | (2006.01) |

(52) U.S. Cl.
USPC ........... 348/729; 348/738; 348/555; 348/558; 348/735; 455/143; 455/245.1

(58) Field of Classification Search
USPC ........ 348/554, 555, 556, 558, 725, 726, 729, 348/732, 735, 737, 738; 455/143, 150.1, 455/345, 230, 234.1, 245.1
See application file for complete search history.

(56) References Cited

U.S. PATENT DOCUMENTS

| 5,263,018 | A |   | 11/1993 | Christopher |
| 5,572,264 | A | * | 11/1996 | Mizukami et al. ............ 348/735 |
| 5,596,361 | A | * | 1/1997  | Martinez ....................... 725/123 |
| 5,598,221 | A | * | 1/1997  | Miyahara et al. ............. 348/554 |
| 5,774,195 | A | * | 6/1998  | Miyahara et al. ............. 348/726 |
| 5,825,242 | A | * | 10/1998 | Prodan et al. ................. 329/304 |
| 5,950,112 | A | * | 9/1999  | Hori et al. ..................... 725/148 |
| 6,016,170 | A | * | 1/2000  | Takayama et al. ............ 348/731 |
| 6,125,269 | A | * | 9/2000  | Brekelmans ................ 455/180.1 |

(Continued)

FOREIGN PATENT DOCUMENTS

| WO | WO9426067 A1 | 11/1994 |
| WO | WO0064151 A1 | 10/2000 |

Primary Examiner — Brian Yenke

(57) ABSTRACT

Disclosed is an intermediate frequency processing device for processing both analogue and digital television intermediate frequency signals including vision and sound intermediate frequency signal components, comprising an intermediate frequency signal input for receiving digital or analogue intermediate frequency signals, a processing section, coupled to said intermediate frequency signal input means, for processing intermediate frequency signals, and an output for outputting signals processed in said processing section. The processing section comprises a first band pass filter (1,2,3) connected to said intermediate frequency signal input, and at least two parallel processing portions (4,6a,7,19-22,30-40, 42-45;5,6b,8,18,23-29,46) coupled in parallel to said band pass filter (1,2,3), wherein each of said processing portions includes an inphase quadrature processing means (18,23;19, 22).

23 Claims, 3 Drawing Sheets

(56) References Cited

U.S. PATENT DOCUMENTS

Figure 1:
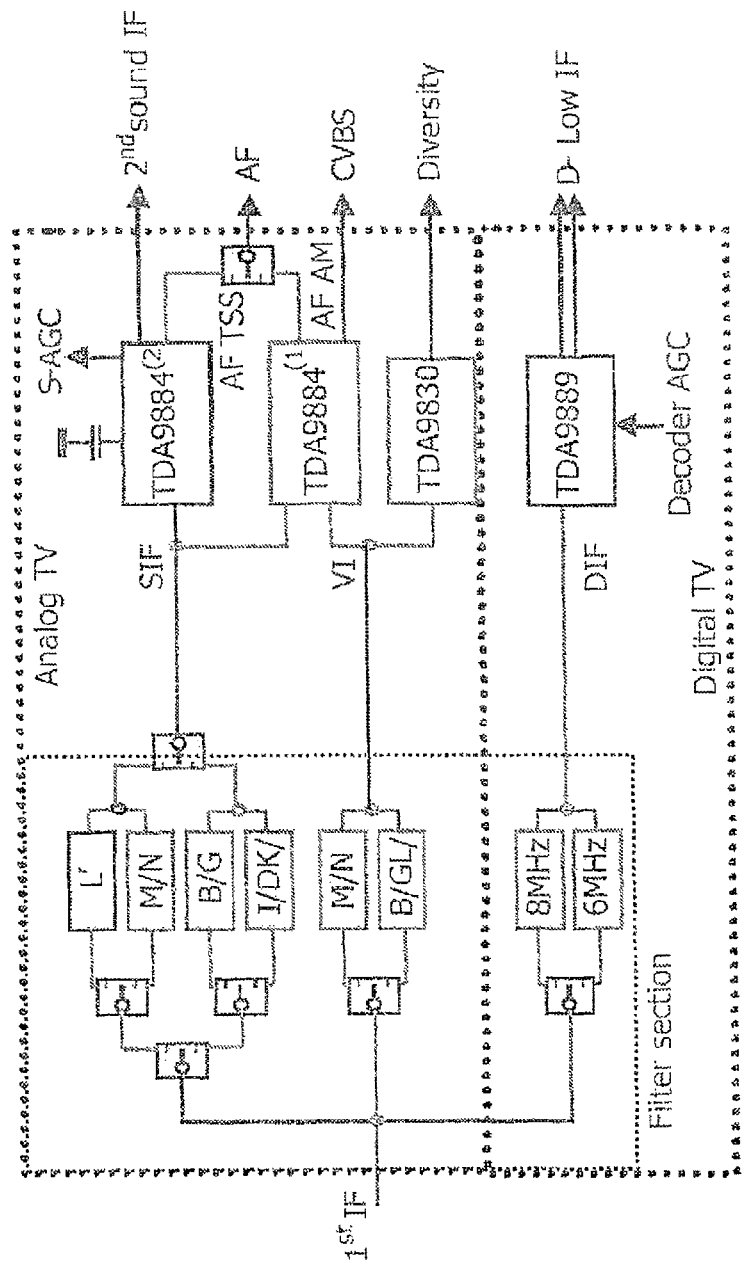

| | | | |
|---|---|---|---|
| 6,163,684 A * | 12/2000 | Birleson | 455/182.3 |
| 6,166,776 A | 12/2000 | Moon | |
| 6,333,767 B1 * | 12/2001 | Patel et al. | 348/725 |
| 6,348,955 B1 * | 2/2002 | Tait | 348/731 |
| 6,369,857 B1 * | 4/2002 | Balaban et al. | 348/555 |
| 6,400,416 B1 * | 6/2002 | Tomasz | 348/654 |
| 6,483,553 B1 | 11/2002 | Jung | |
| 6,501,510 B1 | 12/2002 | Moon | |
| 6,545,723 B1 * | 4/2003 | Han | 348/555 |
| 6,678,011 B2 * | 1/2004 | Yanagi et al. | 348/725 |
| 6,714,600 B1 * | 3/2004 | Okanobu | 375/316 |
| 6,725,463 B1 | 4/2004 | Birleson | |
| 6,757,029 B2 * | 6/2004 | Kurihara | 348/731 |
| 6,963,623 B2 * | 11/2005 | Ninomiya et al. | 375/326 |
| 7,123,309 B2 * | 10/2006 | Yoda | 348/731 |
| 7,180,553 B2 * | 2/2007 | Su | 348/731 |
| 7,202,910 B1 * | 4/2007 | Grubbs et al. | 348/555 |
| 7,227,591 B2 * | 6/2007 | Hwang et al. | 348/729 |
| 7,233,369 B2 * | 6/2007 | Yamamoto | 348/731 |
| 7,250,987 B2 * | 7/2007 | Goyal et al. | 348/725 |
| 7,327,406 B2 * | 2/2008 | Utsunomiya et al. | 348/731 |
| 7,342,614 B2 * | 3/2008 | Mehr et al. | 348/731 |
| 7,414,676 B2 * | 8/2008 | Lindstrom et al. | 348/731 |
| 7,430,019 B2 * | 9/2008 | Kim et al. | 348/606 |
| 7,477,325 B2 * | 1/2009 | Zhu et al. | 348/725 |
| 7,477,327 B2 * | 1/2009 | Okuma | 348/731 |
| 7,567,784 B2 * | 7/2009 | Choi | 455/132 |
| 7,599,010 B2 * | 10/2009 | Yen et al. | 348/731 |
| 7,707,617 B2 * | 4/2010 | Birleson | 725/151 |
| 7,750,978 B2 * | 7/2010 | Zhu et al. | 348/572 |
| 7,876,383 B2 * | 1/2011 | Seo | 348/732 |
| 7,929,649 B2 * | 4/2011 | Zhang | 375/345 |
| 7,940,337 B2 * | 5/2011 | Goyal et al. | 348/725 |
| 2002/0008787 A1 | 1/2002 | Kurihara | |
| 2002/0089605 A1 * | 7/2002 | Min | 348/565 |
| 2005/0177860 A1 * | 8/2005 | Goyal et al. | 725/118 |

* cited by examiner

BACKGROUND

INTERMEDIATE FREQUENCY PROCESSING DEVICE FOR PROCESSING BOTH ANALOGUE AND DIGITAL TELEVISION INTERMEDIATE FREQUENCY SIGNALS

The present invention relates to an intermediate frequency processing device for processing both analogue and digital television intermediate frequency signals including vision and sound intermediate frequency signal components In modern television receiver concepts designed for analogue and digital television front ends, different functions must be combined for intermediate frequency (IF) signal processing. Those multi-application concepts cannot only be used for conventional television applications, but also for video and audio recording, computer boards for television/radio reception and television reception for car mobile applications, and can further include FM radio reception.

Such front end designs are adapted to specific design targets so that their designs are different because of savings in effort and required performance. The differences are mainly based on performance and covered functions. Furthermore, the number of used intermediate frequency filters and the number of integrated circuits is different, too.

In particular, for global applications including analogue television demodulation and digital television tuning, a lot of filter functions are needed, since there are many different television standard configurations. E.g. for analogue television sound processing, there are a plurality of various frequency configurations for two carrier sound, NICAM (Near Instantaneously Companded Audio Multiplex), FM (Frequency Modulation) multiplex and AM (Amplitude Modulation). This requires the provision of different filter shapes, wherein in particular the television system L (SECAM) needs dedicating band pass filtering.

A prior art car mobile intermediate frequency processing device is shown in FIG. 1 and is provided for processing a tuned intermediate frequency input signal in a range of about 30 MHz to 40 MHz. This intermediate frequency signal is called first intermediate frequency signal $1^{st}$ IF and is inputted into the intermediate frequency processing device which is part of a television front end. Such a television front end part includes two functional blocks for analogue television processing and digital television processing. The function of the analogue television processing block of the television front end part is to demodulate the AM modulation (video) of the analogue television vision carrier and to further demodulate either the FM mono television sound or AM mono television sound. So, the output signal of this intermediate frequency processing section is a composite video and mono television sound signal. Furthermore, this intermediate frequency processing section outputs a second sound intermediate frequency signal ($2^{nd}$ sound IF) which includes television system related sound carriers for further television stereo sound processing (two carrier system, NICAM or FM multiplex). Moreover, a vision carrier envelope detector output signal is provided for antenna diversity.

US 2002/0008787 A1 discloses a television receiving apparatus for receiving an analogue television broadcast and a digital television broadcast, which apparatus comprises a tuner means for receiving both an analogue television broadcast signal and a digital television broadcast signal, selecting a signal having a desired carrier frequency from the received signals, and converting the selected signal having the desired carrier frequency into an intermediate frequency signal, an analogue demodulating means for demodulating the analogue television broadcast signal to a video signal, a digital demodulating means for demodulating the digital television broadcast signal to a base band signal, a first filter means disposed downstream of the tuner means, a second filter means disposed between the first filter means and the analogue demodulating means, and a third filter means disposed between the first filter means and the digital demodulating means. So, this conventional apparatus makes use of intercarrier sound processing for analogue television, and comprises cascaded filters for analogue and digital television broadcasting. The described analogue television demodulation is conventional, wherein the vision and sound processing is state of the art, e.g. as carried out in a TDA9801.

WO 0064151 A1 discloses an intermediate frequency signal processing apparatus for processing both analogue and digital signals, which apparatus comprises a signal source for providing digital or analogue intermediate frequency signals, a first filter having an output for filtering the intermediate frequency signal, a digital signal processing circuit coupled to the output for processing a filtered intermediate frequency signal, and an analogue signal processing circuit coupled to the output for processing which includes the filtering of a filtered analogue signal. So, in a similar manner as the apparatus of US 2002/0008787 A1, the analogue television demodulation is conventional, and this apparatus includes cascaded filters for analogue and digital television broadcasting, but makes use of a quasi split sound processing for analogue television.

U.S. Pat. No. 6,483,553 B1 shows a combined television receiver for receiving and processing an analogue broadcasting signal as well as a digital broadcasting signal. This combined television receiver includes a controller determining whether a channel selected a user is digital broadcast or an analogue broadcast. The controller generates station selection data on the selected channel and a control signal pertinent to the determination. A tuner receives the station selection data and tunes to a broadcasting signal associated with the selected channel, out of signals received through an antenna. A switch unit forwards the broadcasting signal tuned at the tuner, in response to the control signal, to either an analogue broadcasting processor or a digital broadcasting processor. An automatic gain controller receives a gain signal either from the analogue broadcasting processor or from the digital broadcasting processor, and adjusts a signal gain of the broadcasting signal tuned at the tuner, thereby allowing reception of both analogue and digital signals. So, according to the concept of this conventional receiver, the tuner output signal is branched via the switch unit into two separate branches used either for analogue television processing or digital television processing.

U.S. Pat. No. 6,501,510 B1 discloses a digital/analogue broadcast signal processing unit by which a video/audio signal can be processed by receiving an analogue broadcast signal and a digital broadcast signal and switching a signal processing block which is used in common for digital broadcast signal processing and analogue broadcast signal processing. The digital/analogue broadcast signal processing unit includes a digital broadcast signal processor for demodulating the digital broadcast signal tuned by the tuner, demultiplexing the demodulated digital broadcast signal into video and audio signals and decoding the audio and video signals. An analogue broadcast signal demodulator is provided for demultiplexing the analogue broadcast signal tuned by the tuner into analogue video and audio signals and demodulating the video and audio signals. An audio switching unit receives the audio signals outputted from at least one of the digital broadcast signal processor and analogue broadcast signal demodulator and selects one input signal. A video switching unit receives the video signals outputted from at least one of the digital broadcast signal processor and analogue broadcast signal demodulator and selects one input signal. An audio signal processing block is provided for receiving the output signal from the audio switching unit for compensating characteristics of the audio signal, and for outputting the compensated audio signal via a speaker. A video signal processing block is provided for receiving the output signal of the video switching unit, for compensating characteristics of the video signal, and for outputting the compensated video signal. The digital/analogue broadcast signal processing unit further includes a controller for determining whether the digital broadcast signal is received, and generating one of the first switching controlled signal and the second switching control signal for selecting one signal of the audio and video switching units according to the presence or absence of the digital broadcast signal, and a selection of a user via a key input unit connected to the controller. So, the concept of this conventional processing unit is to use separate tuner solutions for analogue and digital television.

U.S. Pat. No. 6,166,776 A describes a multi-receiving demodulator for demodulating signals received from multiple broadcasting systems. This multi-receiving demodulator comprises a first band pass filter for selectively band-pass-filtering an intermediate frequency output from a tuner to obtain a colour sub carrier corresponding to the broadcasting system of a received signal, according to a first control signal, and a second band pass filter for selectively band-pass-filtering the intermediate frequency output from the tuner to obtain an audio carrier corresponding to the broadcasting system of the received signal, according to a second control signal. A video demodulating portion receives the colour sub carrier from the first band pass filter and selectively demodulates a video signal corresponding to the broadcasting system of the received signal in accordance with the controlled signal. An audio demodulating portion receives the audio carrier from the second band pass filter and selectively demodulates an audio signal corresponding to the broadcasting system of the received signal in accordance with the second control signal. A controller detects a power source frequency and channel selection data, and provides the first and second control signals to the first and second band pass filters and the video and audio demodulating portions in accordance with the detected power source frequency and channel control signals. This prior art deals with a state of the art analogue television concept for multi standard television intermediate frequency processing as used since about 1988, e.g. like in TDA 3842 and TDA 3856/66, or partly even used since 1978, e.g. like in TDA 2541 and TDA 2545. Moreover, this conventional device makes use of extensive filter switching for the video and audio branches, too.

As it becomes clear from the above, the conventional systems make use of a high number of different application specific filters and related switching circuits. However, due to the provision of a high number of different filters for analogue and digital television and of the related switching circuits the construction of the device is very complex, which results in higher production costs.

An object of the present invention is to avoid the drawbacks of the prior art and in particular an extensive use of filters and related switching.

In order to achieve the above and further objects, according to the present invention there is provided an intermediate frequency processing device for processing both analogue and digital television intermediate frequency signals including vision and sound intermediate frequency signal components, comprising an intermediate frequency signal input for receiving digital or analogue intermediate frequency signals, a processing section, coupled to said intermediate frequency signal input, for processing intermediate frequency signals, and an output for outputting signals processed in said processing section; wherein said processing comprises a first band pass filter connected to said intermediate frequency signal input; and at least two parallel processing portions coupled in parallel to said band pass filter, wherein each of said processing portions includes an inphase quadrature processing means.

The architecture according to the present invention allows a common use of a first band pass filter (with a flat pass band having a frequency response shape like a window) for analogue television and digital television. This is achieved by placing the first band pass filter at the input side and implementing at least two parallel processing portions coupled in parallel to the first band pass filter so that each of the parallel processing portions makes use of the first band pass filter in a shared manner, wherein each of the parallel processing portions includes an inphase quadrature processing means. So, the parallel processing portions define separate signal processing chains, wherein the implementation of inphase quadrature processing is provided inter alia for demodulation of analogue television signals to replace the need of a nyquist slope of surface acoustic wave filters as used in the prior art concepts for analogue television and further for additional band bass filtering for digital intermediate frequency processing for digital television. Moreover, the digital intermediate frequency signal can be set to all known intermediate frequency modes in order to be compatible to all externally used channel decoders for a digital video broadcast (DVB).

Due to the integrated filter technique and the sharing of functional blocks, not only effort can be reduced, but also the required circuit board space becomes smaller so as to achieve a higher integration within an integrated circuit. In particular, a high economic is achieved due to the shared use of the first band pass filter for analogue television and digital television. Moreover, custom use of external components allows better performance adaption for the required application field.

After all, the present invention results in a simplified application (in particular "plug and play") for digital as well as for analogue television receivers, a reduction of the total costs and a higher flexibility in production, and provides for a true global television intermediate frequency processing supporting all world wide analogue television intermediate frequency standards and world wide DVB standards as well as FM radio by using a common first band pass filter.

Further advantageous embodiments are defined in the independent claims.

In particular, one of said parallel processing portions is adapted for processing vision intermediate frequency signal components and the other of said parallel processing portions is adapted for processing sound intermediate frequency signal components.

The parallel processing portion should be provided so as to operate essentially independently from each other in order to define independent signal processing chains, respectively.

In a preferred embodiment, said processing section further includes setting means for setting said first band pass filter so as to adapt the filter characteristics of said first band pass filter to the signal processing in said processing portions.

For example, the intermediate frequency processing for digital television systems requires for the first band pass filter a filter characteristic which is amplitude and group delay flat in pass band over the wanted television channel bandwidth and signal suppression outside wanted channel. Such a band pass filter shape is like a window over the frequency and, therefore, called "window filter". The concept of the present invention makes use of such a filter characteristic for both analogue and digital television processing. In case of a front end design for global use the minimum filter bandwidth is about 6 MHz, e.g. for ATSC (Advanced Television Systems Committee—the US standard for digital television), which can be used for vision carrier demodulation for all analogue television systems. Consequently, the disadvantage of the prior art concepts using a number of several application specific filters for analogue and digital television system has been overcome by the common use of the first band pass filter according to the present invention.

According to a modification of the above embodiment, said first band pass filter comprises a plurality of band pass filters having different filter characteristics, and said setting means comprises switches for selectively connecting at least one of said processing portions to one of said band pass filters, wherein in particular said first band pass filter may comprise three band pass filters each having a different fixed filter characteristic. So, the switches are provided for individual assignment of the filters to the signal processing chains in the processing portions. By using only three fixed input filters of the first band pass filter it has been found that essentially all world wide analogue television intermediate frequency standards and world wide DVB standards as well as FM radio can be supported.

Preferably, each of said processing portions includes an automatic gain control, wherein an automatic gain control of one processing portions may be adapted so as to operate essentially independently from an automatic gain control of another processing portion. So, the provision of separate gain control amplifiers and further separate conversion for analogue vision intermediate frequency and sound intermediate frequency/digital frequency allows the use of different filter shapes, band width and individual split for vision intermediate/sound intermediate frequency automatic gain control systems.

The output of an inphase quadrature processing means may be connected to the input of an automatic gain control, which is in particular suitable for analogue television system and also AM radio.

The output of said first band pass filter may be connected to the input of a gain controlled amplifier, and the output of said gain controlled amplifier may be connected to the input of an automatic gain control, which is particularly suitable for FM radio.

Accordingly, two independently operating automatic gain control loops for analogue television sound may be provided, wherein a first gain control loop is based on the signal bandwidth of the first band pass filter and a second gain control loop after a second sound intercarrier conversion is based on the mono FM sound level only. After passing the second gain control loop all sound carriers are level controlled and passed to an output buffer stage which allows connection to a separate device for sound and stereo decoding.

In a further preferred embodiment, a processing portion used for processing analogue vision intermediate frequency signal components comprises three parallel paths, wherein a first path provided for demodulation includes said inphase quadrature processing means, a second path provided for carrier recovery includes a voltage controlled oscillator locked by a frequency and phase detector loop technique to a carrier, and a third path provided for carrier level detection includes an envelope detector.

According to a modification of the above mentioned embodiment, the inputs of said three parallel paths are coupled in parallel with the output of a gain controlled amplifier controlled by an automatic gain control.

In a further preferred embodiment, the output of said inphase quadrature processing means is coupled to a sound carrier trap and further coupled to a bypass switch connected in parallel to said sound carrier trap so as to pass the output signal of said inphase quadrature processing means optionally either through said sound carrier trap or via said bypass switch, wherein said sound carrier trap may further include a group delay equalizer. So, this embodiment makes use of a television standard dependent switchable sound carrier trap filtering combined with a television standard dependent equalizing for an overall flat group delay response, taking into account the flat group delay response of the first band pass filter and a television transmitter group delay pre-correction.

In a further preferred embodiment, one of said processing portions further includes a tuner automatic gain control coupled to the output of said band pass filter, said tuner automatic gain control being adapted so as to optionally have an integral control function or a proportional control function. So, either an integral control loop or a proportional control loop can be used for a tuner automatic gain control, wherein an output switch means may be provided for selecting the tuner automatic gain control mode in accordance with the required demodulation mode.

In the still further preferred embodiment, a processing portion used for processing analogue sound intermediate frequency signal components comprises a frequency converter with image rejection function, a first oscillator generating a first oscillator signal which is locked to a vision intermediate frequency carrier by a phase locked loop, and a second oscillator generating a second oscillator signal which is synthesizer based so as to optionally use said first or second oscillator signal for controlling said frequency converter.

According to a modification of the above embodiment, said frequency converter includes an inphase quadrature processing means comprising an inphase quadrature multiplier, an image rejection filter having a passive poly phase filtering function for processing inphase quadrature output signals outputted form said inphase quadrature processing means, and a sideband select control for optionally inverting the polarity of the inphase quadrature output signal so that said image rejection filter optionally passes or rejects the input signals of said inphase quadrature processing means which are above the frequency of said first or second oscillator signal or vice versa. So, a frequency conversion is used with image rejection, which can either be done by using an oscillator signal which is PLL (phase locked loop) locked to a vision intermediate frequency carrier, or by using another oscillator signal which is synthesizer based.

In a further preferred embodiment, one of said processing portions used for processing analogue sound intermediate frequency signal components further includes a second band pass filter adapted for passing all carriers of a selected analogue television sound system, wherein said second band pass filter may be adapted so that its center frequency can be shifted to use it for different analogue television sound system and/or said second band pass filter may be coupled to the output of said inphase quadrature processing means. So, the second band pass filter is used for a second analogue television intercarrier sound band pass filtering, wherein preferably the bandwidth of this sound band pass may be about 1 MHz and thus able to pass all carriers of a selected analogue television sound system (two carrier sound or NICAM).

Moreover, an external fixed frequency sound band pass filter may be provided for a second mono analogue television sound intercarrier filtering which can optionally be used for all television sound input frequencies or for FM radio by using synthesizer for a second sound conversion.

Preferably, for AM sound demodulation in addition to the selectivity of the first band pass filter a further selectivity is provided by an image rejection filter and an additional band pass filter or alternatively by an external band pass filter, and further a standalone automatic gain control system is provided for AM sound, based on the average AM sound carrier level only.

In a further preferred embodiment, one of said processing portions used for DVB intermediate frequency processing comprises a control for switching between three operational modes wherein a first operational mode includes a straightforward amplification, a second operational mode includes a low intermediate frequency processing by using said inphase quadrature processing means, and a third operational mode includes a zero intermediate frequency conversion providing low pass filtered I and Q output signals by using said inphase quadrature processing means. So, this concept serves all current known interfaces of channel decoders.

According to a modification of the above embodiment, said processing portion further comprises an image rejecting filter coupled to said inphase quadrature processing means and a second band pass filter, both said image rejecting filter and said second band pass filter means being adapted to be used in said second operational mode for image rejection and additional band pass filtering.

According to a still further preferred embodiment, one of said parallel processing portions is adapted for demodulating analogue television intermediate frequency signals, and the other of said parallel processing portions is adapted for processing DVB intermediate frequency signals. So, the concept of the present invention allows the use of a "dual mode" which enables a parallel operation of an analogue television demodulation part and a DVB intermediate frequency part. This again allows the detection of the applied transmission system of a tuned channel and after the detection the "dual mode" is switched over to the detected and applied transmission system mode.

After all, the concept of the present invention supports for analogue television with standard composite video blanking signal output, standard mono audio output and second sound intercarrier signal output for further stereo sound processing, wherein an integrated adjacent sound selectivity may support a tuner bandwidth design for a hybrid construction, and further a mono FM radio may be included as well.

The above described objects and other aspects of the present invention will be better understood by the following description and the accompanying figures.

Figure 2:
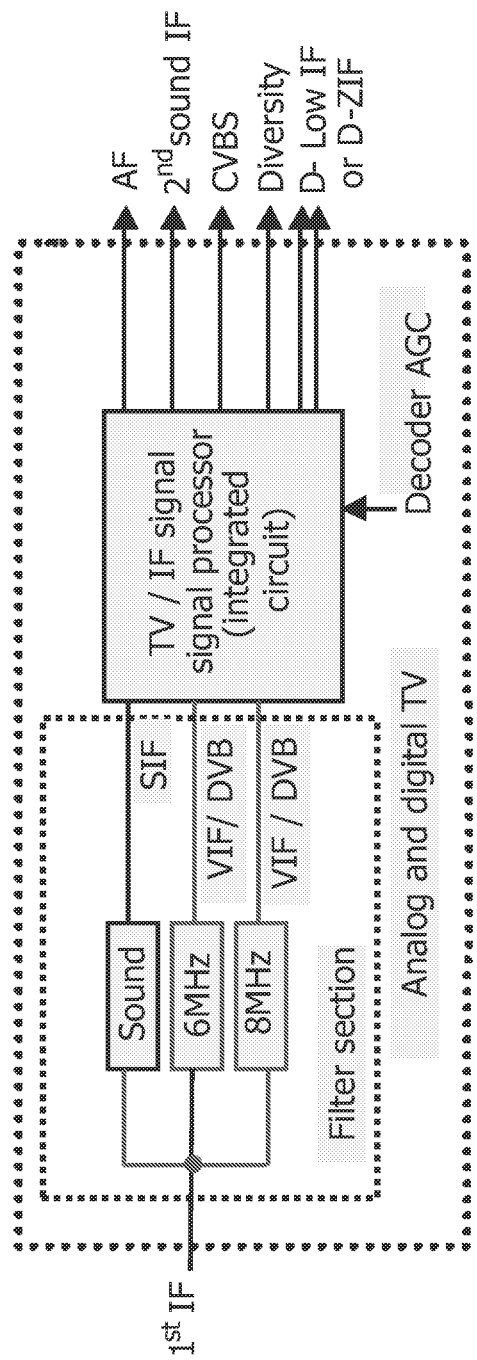
Figure 3:
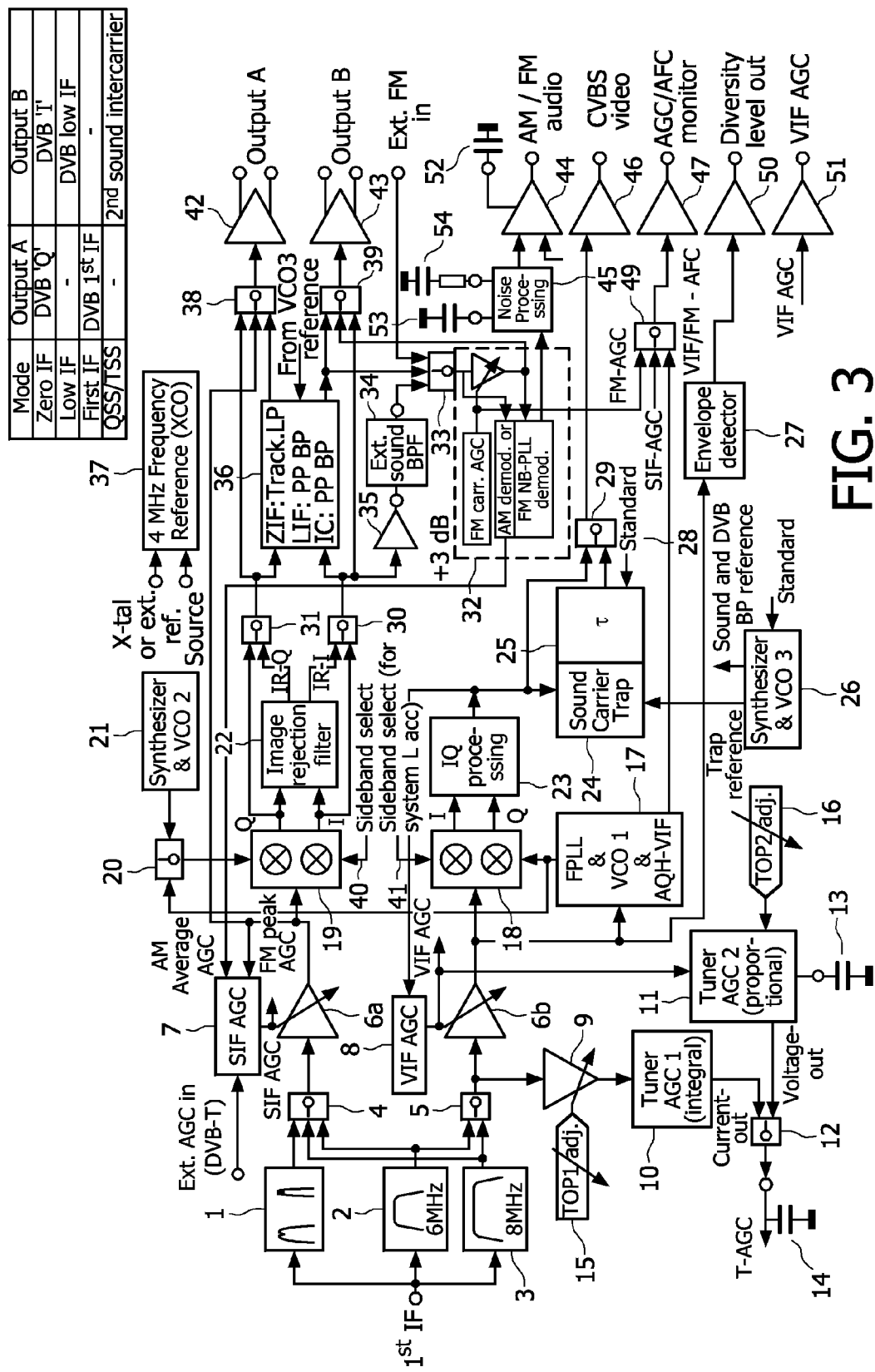

A preferred embodiment of the present invention is described with reference to the drawings in which FIG. 1 shows a schematic basic block diagram of a prior art intermediate frequency processing device;

FIG. 2 shows a schematic basic block diagram of an intermediate frequency processing device according to a preferred embodiment of the present invention; and FIG. 3 shows an integrated circuit implementation of the device of FIG. 2 in greater detail.

FIG. 2 shows a schematic basic block diagram of an intermediate frequency processing device according to a preferred embodiment of the present invention for processing both analogue and digital television intermediate frequency signals including vision and sound intermediate frequency signal components. FIG. 3 shows a circuit diagram of an integrated circuit implementation of this device in greater detail.

An RF (radio frequency) input signal from an antenna (not shown) is amplified and converted by a tuner to a first intermediate frequency (IF) (of about 30 MHz to 40 MHz). This first intermediate frequency signal $1^{st}$ IF is fed to SAW (surface acoustic wave) filters 1 to 3.

In case of conventional analog TV (television) reception, the IF signal is split into a sound processing portion and a vision processing portion. The sound processing portion is selected by a SIF (sound intermediate frequency)/DIF (digital intermediate frequency)/FM-radio switch 4 and can either get its filtered input via a double band pass filter 1 (e.g. for all analog world standards except system "M") or e.g. for system "M" sound via a 6 MHz band pass filter 2. A VIF (vision intermediate frequency) switch selects the vision portion, too. The 6 MHz band pass filter 2 is provided for all video demodulations of analog TV world standards.

In case of FM radio reception, the IF signal is passed via the SIF/DIF/FM-radio switch 4 to the signal processing part. For FM radio either a small bandwidth part of the double band pass filter 1 for TV sound or e.g. the 6 MHz band pass filter 2 or an 8 MHz band pass filter 3 can be used. The VIF switch 5 is provided to select the same or another filter for tuner gain control.

In case of DVB (digital video broadcasting) reception, the SIF/DIF/FM-radio switch 4 selects either the 6 MHz bandwidth used for ISDB (Integrated Services Digital Broadcasting—the standard for digital television in Japan) or for ATSC (Advanced Television Systems Committee—the standard for digital television for US and also for Korea) or the 8 MHz bandwidth related to DVB systems in Europe. Using the integrated filtering of this architecture or using the integrated filtering of a channel decoding allows also using the 8 MHz bandwidth input for DVB standards in case of a 7 MHz system bandwidth.

For analog TV vision demodulation the signal from the VIF switch 5 is passed to a gain controlled amplifier 6b. By automatic gain control (AGC) carried out by a VIF AGC circuit 8, the picture carrier output level of this amplifier 6b is controlled to constant amplitude. The output of the gain controlled amplifier 6b is split into three paths.

A first path is used for carrier level detection. The signal is fed to an envelope detector 27. This envelope detector 27 can be used for antenna diversity and supports ultra fast diversity scan at e.g. back porch of the vision carrier. The output signal of the envelope detector 27 is fed to an output buffer 50 for driving an output load (not shown).

The second path is used for carrier recovery in a circuit 17. This circuit 17 includes a voltage controlled oscillator (VCO) VCO1 (not shown in detail) which is locked by a frequency and phase detector loop control technique to the applied picture carrier. To cope with a wide range of picture carrier frequencies, a digital control loop is implemented in addition to the frequency and phase detector loop (not shown in detail) in the circuit 17, too. This digital control loop is based on VCO 1 frequency measurement by counter technique, wherein a counter (not shown in detail) is included in the circuit 17 and provides a picture carrier frequency information if the VCO1 is locked to the applied picture carrier. This frequency information is converted into a suitable output format, and the information is either provided for automatic frequency control (AFC) in a digital format to an IIC bus interface or digital to analog converted via an AFC/AGC switch 49 to an output buffer 47.

The third path is used for demodulation. Two matched multipliers in a multiplier circuit 18 are used for the demodulation of the VIF input signal. The applied VIF input signal is multiplied with the VCO 1 signal from the carrier recovery loop of the circuit 17. The first multiplier uses the VCO 1 signal in a phase synchronic condition (inphase) to the picture carrier, and for the second multiplier the VCO 1 signal is 90° degree shifted (quadrature) to the picture carrier. The output of the multipliers are so called I (inphase) and Q (quadrature) signals. These output signals are fed to an inphase quadrature processor 23. There, the signals are processed for combining double and single sideband parts of an AM (amplituted modulation) modulated vestigial sideband of the vision IF signal. This can either be done by adding up the I and Q signals with a phase shift to gain the wanted sideband for passing and to suppress the unwanted sideband, or by poly phase filtering. The inphase quadrature processing replaces a state of the art nyquist filtering (done by SAW filters) in front of a multiplier used for VIF demodulation. Consequently, by using the inphase quadrature processing, the input filter can have a flat band pass characteristic (see FIGS. 5 and 6) as needed for digital video broadcasting (DVB) for the use of analog TV demodulation, too.

The inphase quadrature processing provides additional suppression for unwanted signals which may appear at an unwanted sideband. By such a sideband suppression the high stop band requirements of SAW filters can be reduced. This saves effort for SAW filter design and makes additional notch filters (e.g. L/C circuits) as used in state of the art tuner designs superfluous.

The Q output of the multiplier circuit 18 is switchable in polarity. A signal input 41 created by a sideband select switch (not shown) can optionally control an inversion of the Q output polarity. By this inversion the inphase quadrature processing selects the upper or lower single sideband for demodulation, i.e. selects the unwanted sideband for suppression. This switch function is needed to handle a specific television standard (TV system L band I as used in France).

The output signal of the inphase quadrature processor 23 is used for input of the automatic gain control function of the VIF AGC circuit 8. This control circuit for analog TV uses the magnitude of the demodulated vision signal for picture carrier level detection. This level information is input for an integral control loop. The output of this control loop is a control signal which modifies the gain of an amplifier 6b controlled by the VIF AGC circuit 8. The gain modification is finished when a specified vision level is present at the output of the inphase quadrature processor 23.

The gain controlled output signal of the inphase quadrature processor 23 is passed either via a trap bypass switch 29 to a vision output buffer 46 or to a sound carrier trap 24. The bypass switch 29 can be used for user specific applications.

The sound carrier trap 24 removes analog TV sound carriers which are superimposed to the demodulated vision signal. The superimposed sound carrier can be very strong in level, depending on the used TV standard and the used bandwidth of the SAW filter. Thus the notch of the trap filter needs to be very accurate and switchable in frequency. This is performed and controlled by a synthesizer and VCO 3 block 26. Furthermore a group delay equalizer 25 is connected to the sound carrier trap 24 using analog TV standard dependent characteristics. This equalizer 25 takes into account the flat group delay response of the input SAW filter, the analog TV standard dependent transmitter group delay pre-correction and the group delay of the notch characteristic of the sound carrier trap 24. The output of the equalizer 25 has an overall flat group delay characteristic. The flat group delay characteristic provides an optimum pulse response, colour transient and chrominance/luminance performance. Via the trap bypass switch 29 the filtered vision signal is fed for signal output to a vision output buffer 46.

The first IF signal (SAW filter input signal) is gain controlled in case of high tuner input signals. This gain modification is done by the variable gain of the tuner (not shown) and controlled by one of the two available detector circuits shown in FIG. 3.

Either by a tuner AGC 1 detector 10 or by a tuner AGC 2 detector 11 the tuner gain control can be performed. A selection of the AGC can be done by a tuner AGC switch 12.

For the tuner AGC 1 control the output signal of the VIF switch 5 is applied to the input of an adjustable gain amplifier 9. The tuner AGC1 is preferably used for tuner AGC control in case of digital DVB IF, FM radio and negative modulated VIF signals for analog TV. A TOP (Take Over Point) 1 adjusting element 15 sets the starting level of a tuner AGC 1 gain control. The tuner AGC 1 detector 10 generates sink or source currents which are converted to a tuner AGC voltage by using an external tuner AGC capacitor 14.

For tuner AGC 2 control a VIF automatic gain control voltage outputted from the VIF AGC detector 8 is applied to the proportionally operating tuner AGC 2 detector 11. The AGC 2 loop requires a very high time constant; this time constant is achieved by an external capacitor 13 connected to the AGC 2 detector 11. The tuner AGC 2 start level is adjusted by a TOP (Take Over Point) 2 adjusting element 16. The output of the tuner AGC 2 detector 11 has the function of a voltage source so that the capacitor 14 at the tuner AGC output follows directly the generated output voltage and does not contribute additional delays in gain control. Thus, the time constant is only determined by the capacitor 13. The tuner AGC 2 loop is preferably used for the analog TV system L (France), because the high AM sound carrier combined with unpredictable occurrence of peak picture carrier could make negative effects when using the integral tuner AGC 1 loop.

For analog TV sound processing the filtered sound carrier signal is selected by the SIF/DIF/FM-radio switch 4 and processed by a variable gain amplifier 6a. For FM modulated sound carriers the output level is fed for level detection and automatic gain control into an SIF AGC circuit 7. Based on the peak output level of the variable gain amplifier 6a, the output is set to a specified target level by the SIF AGC circuit 7. Consequently, the output of the variable gain amplifier 6a is protected against overdrive and based on the used SAW input filter, and the best level condition for the sound demodulation is automatically selected.

For sound conversion two matched SIF multipliers included in a multiplier circuit 19 are used. The applied SIF input signal is either multiplied with the VCO 1 signal from the carrier recovery loop of the circuit 17 or multiplied with the VCO 2 signal of a synthesizer 21. By a QSS (quasi split sound)/TSS (true split sound) switch 20 the selection of different VCO signals is done. The first multiplier uses the selected VCO 1 or VCO 2 signal, and the second multiplier uses the selected VCO 1 or VCO 2 signal by a 90° phase shifting. In accordance with the output of the VIF demodulator part with 0° and 90° of VCO 1, the output signals from the SIF multipliers of the multiplier circuit 19 are named I and Q output signals, respectively. These I/Q output signals are fed to an image rejection filter 22 and processed by passive poly phase filtering. An input signal 40 created by a sideband select switch (not shown) can optionally control an inversion of the polarity of the Q output from the SIF multipliers of the multiplier circuit 19. Depending on this sideband select switch signal input 40, the image rejection filter 22 passes or rejects output signals from the SIF multipliers, which signals are above VCO1 or VCO2 frequency or vice versa.

Due to this image reject filtering a part of the SIF input spectrum is already filtered. E.g. if the double band pass SAW filter 1 is used, one of the two band passes are rejected, so that only one pass band is effective.

The output signals IR-I and IR-Q from the image rejection filter 22 are passed via band pass filter input switches 30 and 31 to a poly phase band pass filter 36. For analog TV sound this band pass filter 36 is operating in an IC PP BP mode (intercarrier poly phase band pass) and provides a pass band characteristic in accordance to the received analog TV standard. Thus, the bandwidth of this band pass is about 1 MHz for all analog TV world standards including two carrier TV sound systems and NICAM transmission. The stop band is adapted for colour carrier suppression for the different TV standards.

The center frequency of the band pass filter is tuneable. A TV standard related logic switch control (not shown) sets the standard dependent band pass filter center frequency. A synthesizer based reference signal created by a synthesizer and VCO 3 circuit 26 tunes the band pass center frequency to the required accuracy.

The output of the band pass filter 36 is either fed to an output B selector 39 or to a mono sound input selector 33. These selectors 33, 39 are set by a switch logic (not shown). One of many useful combinations for analog TV sound is to pass the output signal of the band pass filter 36 via the mono sound input selector 33 to a mono sound demodulator 32.

The IR-I signal outputted from the image rejection filter 22, which signal is selected by the band pass filter input switch 30, is additional branched via a fixed gain amplifier 35 to an output stage for mono sound filtering by an external device. This can e.g. be a fixed ceramic band pass filter 34 with band pass characteristics for mono sound carrier only. This optional band pass filter can e.g. be used, when the synthesizer and VCO 2 circuit 21 is used for a second sound conversion. This optional filtering is provided for applications where high sound selectivity is required. Using the synthesizer and VCO 2 circuit 21 allows the use of one fixed external filter device, because the different sound carrier input frequencies at the output of the SIF/DIF/FM-radio switch 4 can be corrected to the center frequency of the external filter device by an adapted frequency of the synthesizer and VCO 2 circuit 21. A minimum frequency step of 500 kHz is required for adapting the synthesizer to the external filter device with fixed frequency. Examplary applications for this purpose are FM radio or in car analog TV or analog TV system M with high MPX (multiplex) selectivity.

For analog TV systems with FM sound, the applied FM carrier is VCO locked by a narrowband PLL based FM demodulator included in a circuit 32. The VCO lock range of the FM demodulator is selected by control logic in accordance with the TV sound standard applied. The input of the narrowband PLL based FM demodulator requires an automatic gain control (AGC) for the FM mono sound carrier. This AGC loop is performed by FM mono sound carrier level detection (done by a synchronous detector using the locked VCO of the FM PLL) in conjunction with an AGC detector and variable gain amplifier. By this gain control the output of the variable gain control amplifier provides a defined target level for the mono FM sound carrier. The levels of other carriers transmitted for e.g. two carrier sound or NICAM systems are modified by the same gain variation. Therefore the levels of these carriers are kept in accordance with their level ratios to the FM mono sound carrier. The output of this variable gain controlled amplifier is additionally branched to the output B selector 39. Thus, it is possible to output for e.g. two carrier sound, NICAM and MPX signals for advanced stereo sound processing by using a separate external device.

For demodulation, the gain controlled FM mono sound carrier is passed to the FM narrow band PLL (phase locked loop) demodulator included in the block 32. The demodulated and amplified FM sound signal output is fed into an sound noise processing circuit 45. The sound noise processing has a switchable function. If this function is switched off (bypass), the sound is directly passed through to a sound buffer 44, which additionally provides switchable de-emphasis by using an external capacitor 52. In case the noise processing is switched on, the sound signal is controlled in gain and bandwidth by a noise detector. If under weak signal conditions noise is detected, dependent on the noise level the sound gain and bandwidth is reduced. This function is needed especially for in car TV reception or FM radio.

For the analog TV standard using AM modulation for mono TV sound, the AM sound carrier is basically processed in the same way as the FM sound carrier using all the benefits for carrier selectivity provided by the image rejection filter 22, the integrated band pass filter 36 or the external sound band pass filter 33; however, a different automatic gain control is used. The gain control needs to be related to an average carrier level and to prevent interaction with the carrier variation caused by the AM sound itself, and needs to be slower than the lowest sound frequency. Therefore, the AM sound carrier passes the mono sound input selector 33 and is fed to a mono sound demodulator which is also included in block 32. Inside the mono sound demodulator of block 32, the AM carrier does not use the variable gain amplifier, but is fed with fixed gain directly to the AM mono sound demodulator. The demodulated sound is derived from the carrier amplitude, and this carrier amplitude signal is fed to the SIF AGC circuit 7. For AM sound amplitude control the SIF AGC circuit 7 modifies the gain of the variable gain amplifier 6a until the defined target AM sound amplitude is achieved. The demodulated AM sound signal is fed to the sound output buffer 44, which provides also low pass filtering to remove high frequency signal residues. Independent on AM sound demodulation, a second sound intercarrier signal and NICAM carrier is provided via the output switch 39 to the output B buffer 43, which allows advanced sound processing (NICAM decoding) using a separate external device.

For digital video broadcasting the DVB signal is selected by the SIF/DIF/FM-radio switch 4. The selection is either the 6 MHz bandwidth SAW filter 2 used for the ISDB system (Japan) or for the ATSC system (USA; Korea) or the 8 MHz bandwidth SAW filter 3 related to DVB systems in Europe. Using the integrated filtering of this architecture or using the integrated filtering of the channel decoding also allows using the 8 MHz bandwidth input for DVB standards in case of the 7 MHz system bandwidth.

The variable gain amplifier 6a amplifies the input DVB signal, wherein the gain control of the amplifier is done by a control signal which is generated by an external device (not shown) used for channel decoding. The input voltage for gain control provided by an external device used for channel decoding is applied to an external input of the SIF AGC circuit 7. The output of the variable gain amplifier 6a is either fed to the multiplier circuit 19 for frequency conversion or directly fed to the input of the signal selector 38 for output A.

The output signal of the variable gain amplifier 6a can be processed in three different modes for channel decoding. The different modes are provided to cover all signal interfaces used by different channel decoding devices.

For channel decoders using no frequency conversion of the filtered input spectrum, the output signal from the variable gain amplifier 6a is fed via the signal selector 38 for the output A. By logic control (not shown) the signal is switched to the differential output A ports of an output A buffer 42. The frequency range of this straightforward amplification is adapted to the frequency range of all used DVB standards of the world, so that it can operate up to 60 MHz.

Another mode using frequency conversion is available for channel decoders which can accept a low intermediate frequency (low IF) input spectrum. This frequency conversion is combined with integrated band pass filtering and image rejection, wherein it is the preferred mode for high performance. Furthermore the low IF output signal is less sensitive to capacitive load and conducted interference. Thus, applications using e.g. different channel decoders for DVB-T (T=terrestrial) and DVB-C (C=cable) in parallel can easily be used with a branched (and long) signal track connected to the low IF output B buffer 43 having differential output B ports.

For low IF processing, the output signal of the variable gain amplifier 6a is fed to the multiplier circuit 19.

The applied (digital intermediate frequency) DIF input signal is multiplied with the VCO 2 signal of the synthesizer and VCO 2 circuit 21. Thus the QSS/TSS switch 20 is selected for use of the VCO 2 signal.

The first multiplier of the circuit 19 uses the VCO 2 signal, and the second multiplier of the circuit 19 uses the 90° phase shifted VCO 2 signal. In accordance with the output of the VIF demodulator part with 0° and 90° of VCO 1, the output signals from the multiplier circuit 19 are named I and Q output signals, respectively. These I/Q output signals are fed to the image rejection filter 22 and processed by passive poly phase filtering. The input signal 40 provided from the sideband select switch (not shown) can optionally control an inversion of the polarity of the Q output of the multiplier circuit 19. Depending on this sideband select switch signal input 40, the image rejection filter 22 passes or rejects output signals from the multiplier circuit 19, which signals are above VCO 2 frequency or vice versa. For DVB low IF conversion the preferred operation uses the VCO 2 below input spectrum, thus the Q output polarity is selected for suppressing the DIF input signals below the VCO 2 frequency.

Furthermore, the relation between VCO 2 frequency and DIF input center frequency is chosen for a difference of half the input bandwidth plus 1 MHz. Consequently, the low IF spectrum starts at 1 MHz and stops at 1 MHz plus DIF bandwidth. E.g. for DVB-T in Europe (transmitted with 8 MHz bandwidth) the low IF spectrum starts at 1 MHz and ends with 9 MHz. For further channel selectivity of this spectrum a poly phase band pass filter is used.

Therefore, the output signals of the image rejection filter 22 are passed via the filter input switches 30 and 31 to the poly phase band pass filter 36. For DVB low IF this band pass filter is operating in LIF PP BP (low IF poly phase band pass) mode and provides a band pass characteristic in accordance to the received DVB bandwidth. Thus, the bandwidth of this band pass is 6 MHz, 7 MHz or 8 MHz. A DVB standard related logic switch (not shown) controls the bandwidth. Also a reference frequency synthesizer signal from the synthesizer and VCO 3 circuit 26 is applied and tunes the band pass center frequency to the required accuracy. The output signal of the band pass filter 36 is fed via the output B selector 39 to the output B buffer 43 for signal output.

For zero IF processing the signal processing is fed to the multiplier circuit 19 and processed in the same way as in the case of low IF. However, the VCO 2 frequency is set to the center frequency of the input signal and the inphase quadrature output signals are fed via the filter input switches 30 and 31 directly to the band pass filter 36. This filter 36 is operating for zero IF in low pass mode. There is each one low pass for the I and the Q channel, which are matched in characteristic.

The bandwidth of the low pass is adapted to half of the DVB bandwidth. By logic switch (not shown) control the bandwidth is either 3 MHz, 3.5 MHz or 4 MHz for the corresponding DVB bandwidths of 6 MHz, 7 MHz and 8 MHz. Via the output A and output B selectors 38 and 39 the low pass filtered I and Q signals are fed to the output buffers 42 and 43 for output to a channel decoder with I and Q inputs (not shown).

In a complete TV set application, the output signals of the above described device are also used to identify analog TV or DVB transmission and to set a tuner to the required input frequency. For this purpose a "dual mode" is provided. This mode makes use of the two signal chains available for DVB (signal processing starting at the amplifier 6a) and for analog TV (signal processing starting at the amplifier 6b). As a result of this signal processing, either at a vision output buffer 46 a composite vision blanking signal (CVBS) is available because of the presence of an analog transmission channel, or a useful DVB signal (depending on the DVB mode LIF (low intermediate frequency)/ZIF (zero intermediate frequency)/ straightforward amplification) is available at the output buffers 42 and/or 43. After identification of the transmission system—analog TV or DVB—the dual mode is switched off, and the operation mode is selected in accordance with the identified transmission system.

The "dual mode" can be used with benefit for fast setting up the TV set at the end user side for storing the locally received TV channels. Without this mode, the TV band scan would have been done twice, i.e. one scan to detect analog transmission channels and another scan to detect DVB transmission.

Although the invention is described above with reference to examples shown in the attached drawings, it is apparent that the invention is not restricted to it, but can vary in many ways within the scope disclosed in the attached claims.

Although the invention is described above with reference to preferred examples, it is apparent that the invention is not restricted to it, but can vary in many ways within the scope disclosed in the attached claims.

The invention claimed is:

1. A frequency processing device for processing both analog and digital frequency signals, comprising:
    an intermediate frequency signal input for receiving both the digital and the analog frequency signals;
    a processing section, coupled to said intermediate frequency signal input, for processing the received frequency signals; and
    an output for outputting the processed signals, wherein said processing section further comprises:
        a first band pass filter connected to said intermediate frequency signal input, and
        at least two parallel processing portions coupled in parallel to said first band pass filter, wherein each of said parallel processing sections includes an inphase quadrature processing means and an automatic gain control, an output of the inphase quadrature processing means is connected to an input of the automatic gain control, and makes use of the first band pass filter in a shared manner.

2. The device according to claim 1, wherein a first parallel processing portion is adapted for processing vision intermediate frequency signal components and a second parallel processing portion is adapted for processing sound intermediate frequency signal components.

3. The device according to claim 1, wherein said parallel processing portions operate essentially independently from each other.

4. The device according to claim 3, wherein an automatic gain control of the first parallel processing portion operates essentially independently from an automatic gain control of the second parallel processing portion.

5. The device according to claim 1, wherein said processing section further comprises:
setting means for setting said first band pass filter so as to adapt filter characteristics of said first band pass filter to the signals in said parallel processing portions.

6. The device according to claim 5, wherein said first band pass filter further comprises:
a plurality of band pass filters having different filter characteristics, and said setting means further comprises:
switches for selectively connecting at least one of said parallel processing portions to one of said plurality of band pass filters.

7. The device according to claim 5, wherein said first band pass filter comprises three band pass filters, each band pass filter having a different fixed filter characteristic.

8. The device according to claim 1, wherein an output of said first band pass filter is connected to an input of a gain controlled amplifier, and an output of said gain controlled amplifier is connected to an input of the automatic gain control.

9. The device according to claim 1, wherein one of said processing sections further comprises:
a tuner automatic gain control coupled to the output of said first band pass filter, said tuner automatic gain control being adapted so as to have either an integral control function or a proportional control function.

10. The device according to claim 1, wherein a processing section used for processing analog sound intermediate frequency signal components comprises:
a frequency converter with image rejection function,
a first oscillator generating a first oscillator signal which is locked to a vision intermediate frequency carrier by a phase locked loop, and
a second oscillator generating a second oscillator signal which is synthesizer based so as to use either said first or second oscillator signal for controlling said frequency converter.

11. The device according to claim 10, wherein said frequency converter comprises:
an inphase quadrature processing means comprising an inphase quadrature multiplier,
an image rejection filter having a passive poly phase filtering function for processing inphase quadrature output signals outputted from said inphase quadrature processing means, and
a sideband select control for inverting the polarity of the inphase quadrature output signal so that said image rejection filter either passes or rejects input signals of said inphase quadrature processing means which are above the frequency of said first or second oscillator signal or vice versa.

12. The device according to claim 1, wherein one of said processing portions used for processing analog sound frequency signal components further includes a second band pass filter adapted for passing all carriers of a selected analog television sound system.

13. The device according to claim 12, wherein said second band pass filter is adapted so that its center frequency can be shifted to use it for different analog television sound systems.

14. The device according to claim 12, wherein said second band pass filter is coupled to an output of said inphase quadrature processing.

15. The device according to claim 1, wherein one of said processing portions used for processing analog sound intermediate frequency signal components further includes an external fixed frequency band pass filter adapted for passing mono analog television intercarriers to be either used for all television sound input frequencies or for FM radio.

16. The device according to claim 15, wherein said external fixed frequency band pass filter is coupled to either an inphase or a quadrature output of said inphase quadrature processing means.

17. The device according to claim 1, wherein one of said processing portions used for Digital Video Broadcasting (DVB) intermediate frequency processing comprises a control for switching between three operational modes wherein
a first operational mode includes a straightforward amplification,
a second operational mode includes a low intermediate frequency processing by using said inphase quadrature processing means, and
a third operational mode includes a zero intermediate frequency conversion providing low pass filtered I and Q output signals by using said inphase quadrature processing means.

18. The device according to claim 17, wherein said processing portion further comprises:
an image rejecting filter coupled to said inphase quadrature processing means; and
a second band pass filter, wherein both said image rejecting filter and said second band pass filter are used in said second operational mode for image rejection and additional band pass filtering.

19. The device according to claim 1, wherein one of said parallel processing portions is adapted for demodulating analog television intermediate frequency signals, and the other of said parallel processing portions is adapted for processing Digital Video Broadcasting (DVB) intermediate frequency signals.

20. A frequency processing device for processing both analog and digital frequency signals, comprising:
an intermediate frequency signal input for receiving both the digital and the analog frequency signals;
a processing section, coupled to said intermediate frequency signal input, for processing the received frequency signals;
an output for outputting the processed signals, wherein said processing section further comprises:
a first band pass filter connected to said intermediate frequency signal input, and
at least two parallel processing portions coupled in parallel to said first band pass filter, wherein each of said parallel processing sections includes an inphase quadrature processing means,
wherein a processing section used for processing analog vision intermediate frequency signal components comprises three parallel paths, wherein
a first path provided for demodulation includes said inphase quadrature processing means,
a second path provided for carrier recovery includes a voltage controlled oscillator locked by a frequency and phase detector loop technique to a carrier, and
a third path provided for carrier level detection includes an envelope detector.

21. The device according to claim 20, wherein inputs of said three parallel paths are coupled in parallel with an output of a gain controlled amplifier controlled by an automatic gain control.

22. A frequency processing device for processing both analog and digital frequency signals, comprising:
an intermediate frequency signal input for receiving both the digital and the analog frequency signals;

a processing section, coupled to said intermediate frequency signal input, for processing the received frequency signals;

an output for outputting the processed signals, wherein said processing section further comprises:

a first band pass filter connected to said intermediate frequency signal input, and at least two parallel processing portions coupled in parallel to said first band pass filter, wherein each of said parallel processing sections includes an inphase quadrature processing means;

a sound carrier trap coupled to an output of said inphase quadrature processing means; and a bypass switch connected in parallel to said sound carrier trap so as to pass an output signal of said inphase quadrature processing means, either through said sound carrier trap or via said bypass switch.

23. The device according to claim 22, wherein said sound carrier trap further comprises:

a group delay equalizer.

* * * * *